J. SMITH.
HORSE-POWER.

No. 169,380. Patented Nov. 2, 1875.

UNITED STATES PATENT OFFICE.

JOHN SMITH, OF BURLINGTON, ASSIGNOR OF ONE-HALF HIS RIGHT TO P. E. MERRIHEW, OF FOND DU LAC, WISCONSIN.

IMPROVEMENT IN HORSE-POWERS.

Specification forming part of Letters Patent No. 169,380, dated November 2, 1875; application filed March 29, 1875.

*To all whom it may concern:*

Be it known that I, JOHN SMITH, of Burlington, county of Racine and State of Wisconsin, have invented a new and Improved Horse-Power; and I do hereby declare that the following is a full, clear, and exact description thereof, reference being had to the accompanying drawing, making part of this specification, in which—

Figure 1:
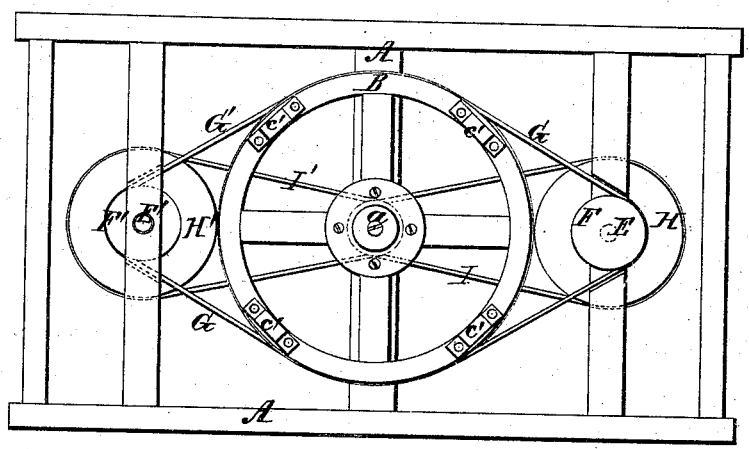
Figure 2:
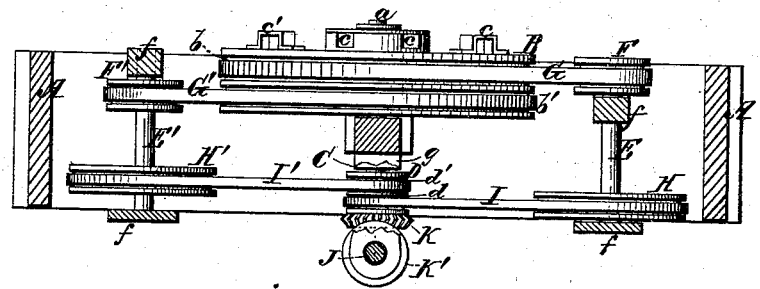
Figure 3:
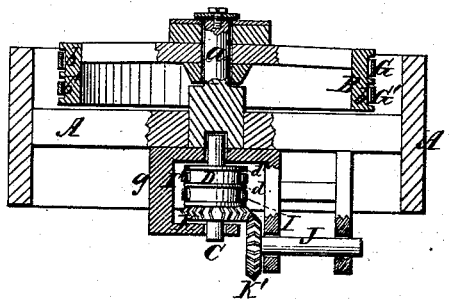

Figure 1 is a top view, Fig. 2 a longitudinal section, and Fig. 3 a cross-section, of my improved horse-power.

The object of my invention is to dispense with a toothed master-wheel and toothed transmitting-wheels in a horse-power of the particular character hereinafter described, whereby simplicity is secured, wearing friction reduced, and much of the jar and breakage from back-lash, where toothed gearing is used, avoided or prevented. The nature of my invention consists in a horse-power which has a master-pulley, having two belts passing from its periphery in opposite directions, and applied in combination with two shafts having pulleys for the aforesaid belts to run upon, and also pulleys for two belts, which transmit the power of the master-wheel to a driving-shaft of the power, as hereinafter specified.

In the accompanying drawings, A is a suitable frame for the horse-power. B is a horizontal master-pulley, fitted around a stationary central arbor, a, of the frame A. This pulley has two grooves, b b', formed in its periphery. It also has sockets c c in its hub, and iron loops c' c' applied to its top, at points equidistant from one another, for receiving the levers which are usually employed in connection with such horse-powers. C is a central shaft beneath, and directly in line with, the arbor a. This shaft is fitted in a bracket, g, of the frame A, and revolves in its bearings. On this shaft is fastened a pulley, D, having two grooves, d d'. E E' are two revolving shafts, fitted in bearings f f of the frame A. On these shafts are fastened pulleys F F', which have only one groove in their peripheries. G G' are belts passing, respectively, from the grooves of the master-pulley B to the pulleys F F'. These belts pass in reverse directions; but they revolve the shafts E E' in the same direction. Below the pulleys F F' there are fastened on the shafts pulleys H H', which have a single groove in their peripheries. I I' are belts passing from the pulleys H H' to the grooves of the pulley D. These belts pass in reverse directions; but they revolve the shaft C in the same direction.

The relative size of the pulleys may be as represented, or varied, as circumstances may require; and the pulleys may be constructed for receiving chains, instead of bands, without departing from the plan of my invention.

J is a shaft for receiving and transmitting the power from the mechanism described; and K K' are bevel-wheels upon the shafts C and J, for forming the connection between the horse-power and the machine to be driven.

There may be another bevel-wheel or a spur-wheel on the end of shaft J, as occasion may require; or the wheel K may be substituted by a pulley, and a belt or chain employed in place of the shaft J, for conveying the power to the machine to be driven.

By my invention the power is taken by two separate belts from the master-wheel, and transmitted by two separate belts to the same shaft. This result has been accomplished heretofore by a toothed master-wheel and toothed gears, but not by pulleys and bands or pulleys and chains.

What I claim is—

The revolving master-pulley B, constructed for receiving two belts, in combination with the pulleys F F', H H', and D, belts G G' and I I', and the shafts E, E', and C, for transmitting power from two belts, which are run upon the master-wheel, to a shaft, C, and therefrom to the shaft to be driven, substantially in the manner shown and described.

JOHN SMITH.

Witnesses:
C. C. GAYLORD,
JULIUS SWEET.